Oct. 2, 1945.  J. OLSSON ET AL  2,386,137
DEVICE FOR AUTOMATIC BRAKING IN LOWERING
OF OBJECTS, SUCH AS BOAT TACKLES
Filed Jan. 12, 1943

INVENTORS:
JOHN OLSSON
NILS EMIL LUNDIN
BY Robert S. Waters
ATTORNEY.

Patented Oct. 2, 1945

2,386,137

UNITED STATES PATENT OFFICE 2,386,137

DEVICE FOR AUTOMATIC BRAKING IN LOWERING OF OBJECTS, SUCH AS BOAT TACKLES

John Olsson, Stockholm, and Nils Emil Lundin, Molle, Sweden

Application January 12, 1943, Serial No. 472,144
In Sweden September 3, 1942

2 Claims. (Cl. 188—65.1)

In lowering of boat tackles in davits it easily happens that the tackle slips away in the hands of the lowering person. The present invention has for its object to prevent by automatic braking said slipping away which otherwise easily takes place when the rope is being lowered only around the cleat of the davit rod particularly at bad weather and when the rope is being unwound from the cleat after having been belayed for a long time.

The invention is substantially characterized by a braking device mounted at the cleat on the davit rod and comprising two elements provided with braking surfaces, one of said elements being stationary on the davit rod, the other element being movable around a pin as a link on the first element and provided with a passage groove for the rope and with a brake claw with a shallow recess for the rope, said recess at the braking cooperating with a shallow recess in a brake claw on the other, stationary element of the brake device.

The invention is illustrated on the accompanying drawing.

1 designates the davit rod, 2 the cleat thereon, 3 the rope, 4 the stationary brake device element on the davit rod, 5 bolts for securing the device to the davit rod, 6 a shallow recess in the stationary brake claw, 7 the turnably mounted brake claw, 8 a shallow recess therein, 9 a fulcrum pin or link for the movable brake claw, 10 a groove in the movable brake claw for the passage of the rope, 11 a stop recess in the stationary brake element for the movable brake element.

Figures 1, 2:
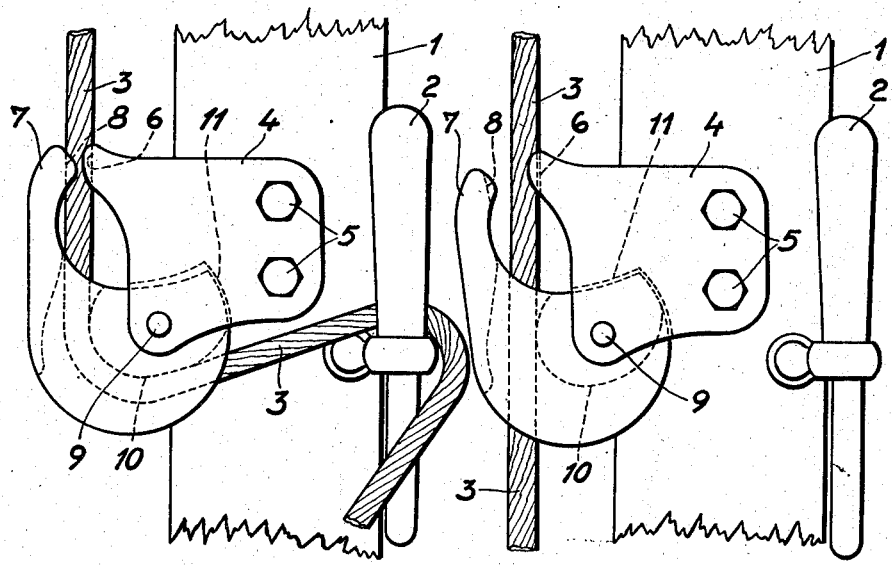
Fig. 1 shows the brake in operation during the lowering of the rope.
Fig. 2 shows the rope after the lowering has ceased, the brake device being in inoperative position.
Figure 3:
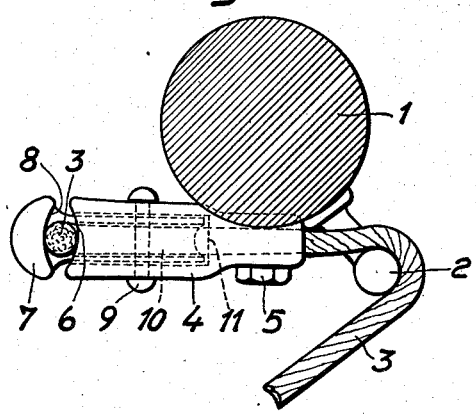
Fig. 3 is a top view of the device.
Figure 4:
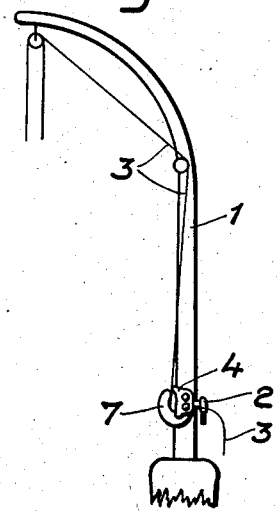
Fig. 4 shows the device mounted at a davit rod.

In lowering of the rope the movable brake claw is automatically turned against the stationary brake claw according to Fig. 1 into the operating position, and then returns to the inoperative position after finished lowering, as will be seen in Fig. 2, whereby the movable brake claw falls outwards and releases the rope.

It is clear from the arrangement that the intensity of the braking increases with the speed of the rope whereby the braking and consequently the lowering will be automatically controlled.

The details of the invention may be varied without going beyond the scope of the invention. The invention may also be used in life-saving ropes and the like.

Having now described our invention, what we claim as new and desire to secure by Letters Patent is:

1. A braking device for ropes and the like comprising a stationary jaw member having a rope engaging portion, a second jaw member pivotally connected to said stationary jaw member and having a rope engaging portion adapted to cooperate with the rope engaging portion of the stationary jaw member to grip a rope between them, said second jaw member being formed with a guideway for the rope, one wall of said guideway in proximity to the point of pivotal connection of the two jaw members and remote from its rope engaging portion, being curved to cause the rope to be curved in an arc around the pivotal connection of the jaw members so that a force applied in one direction to the rope will cause the second jaw member to pivot relative to the stationary jaw member and bring the said rope engaging portion into rope gripping relation.

2. A braking device for ropes and the like comprising a stationary jaw member having a rope engaging portion, a second jaw member pivotally connected to said stationary jaw member and having a rope engaging portion adapted to cooperate with the rope engaging portion of the stationary jaw member to grip a rope between them, said second jaw member having a passageway for the rope therethrough, at least a portion of one of the walls defining said passageway being curved on an arc of which the center is the pivotal point of connection of the said second jaw member with the said stationary jaw member, said curved portion being located at some distance from the rope engaging portion of the said second jaw member and acting to cause the rope following the curvature of said curved portion to be bent at such a radius relative to the pivotal connection of the jaw members that a force applied in one direction to the rope will cause the second jaw member to pivot relative to the stationary jaw member and bring the said rope engaging portions into rope gripping relation.

JOHN OLSSON.
NILS EMIL LUNDIN.